United States Patent
Powell

[11] 3,893,718
[45] July 8, 1975

[54] CONSTRICTED COLLAR INSULATED PIPE COUPLING

[76] Inventor: Jonathan S. Powell, 11 W. State St., Pasadena, Calif. 91105

[22] Filed: Nov. 23, 1973

[21] Appl. No.: 418,254

[52] U.S. Cl. ............... 285/53; 285/331; 285/382.2
[51] Int. Cl. ............................................. F16l 11/12
[58] Field of Search ..... 285/331, 382, 382.1, 382.2, 285/53

[56] References Cited
UNITED STATES PATENTS

| | | | |
|---|---|---|---|
| 1,186,813 | 6/1913 | McFerran | 285/382.2 X |
| 3,149,861 | 9/1964 | Larsson | 285/382.2 |
| 3,288,495 | 11/1966 | Newell et al. | 285/53 |
| 3,454,291 | 7/1969 | Goldsobel et al. | 285/371 |
| 3,686,747 | 8/1972 | Bagnulo | 285/53 X |

FOREIGN PATENTS OR APPLICATIONS

| | | | |
|---|---|---|---|
| 1,809,491 | 5/1970 | Germany | 285/382.2 |

Primary Examiner—Dave W. Arola
Attorney, Agent, or Firm—Lyon & Lyon

[57] ABSTRACT

A pipe coupling including a collar provided with external flanges initially larger than the normal diameter of the collar which, in the course of installation, are constricted until their outer surfaces are essentially flush with the normal surface of the collar causing the portions radially inward of the external end flanges to inbed into pipe ends inserted in the collar. An insulating sealing sleeve is interposed between the collar, including the external flanges and both of the pipe ends to form, when compressed, a seal between the collar and both pipe ends as well as an insulation barrier between the collar and one of the pipe ends. A second insulating sleeve including a flange is disposed within the pipe ends, the flange being disposed between the pipe ends.

2 Claims, 6 Drawing Figures

CONSTRICTED COLLAR INSULATED PIPE COUPLING

BACKGROUND OF THE INVENTION

The conventional means of joining conventional iron pipe such as used in gas lines and water lines, particularly the supply lines to customers of a gas supply company or water supply company is by use of collars having tapered internal pipe screwthreads mating corresponding screwthreads at the ends of the pipe to be joined. Often, to minimize corrosion, it is necessary to separate sections of pipe by insulation material. Usually, this involves confronting flanges screwthreaded onto adjacent pipe ends, the flanges clamping an insulation disk by use of insulated bolts. This construction is both expensive to make and to install.

In a previous U.S. Pat. No. 3,477,750 I disclose a coupling which utilizes a collar capable of being constricted onto a pair of confronting pipe ends. This patent also includes a disclosure of a constrictable coupling arranged to join a metallic and a non-metallic pipe.

SUMMARY OF THE INVENTION

The present invention is directed to a pipe coupling and method of installation and is summarized in the following objects:

First, to provide a constricted collar pipe coupling and method of installation wherein a collar having, initially, a set of external flanges which are intended to be constricted so as to form internal flanges embedded in the ends of pipes previously inserted into the collar.

Second, to provide a pipe coupling as indicated in the preceeding object wherein an insulating and sealing sleeve is interposed between the collar and pipe ends and underlies at least one of the external flanges to form a seal between the collar and both pipe ends as well as an insulating barrier between at least one of the pipe ends and the collar.

Third, to provide a pipe coupling as indicated in the preceeding objects wherein an internal insulating sleeve lines the adjacent ends of the pipe to prevent electrical contact by a metal object such as a metal shaving carried in the fluid stream which might otherwise lodge between the pipe ends.

Fourth, to provide a constricted pipe coupling intended for, but not limited to, installation by use of the constricting tool or die shown in my U.S. Pat. No. 3,579,794.

Figure 1:
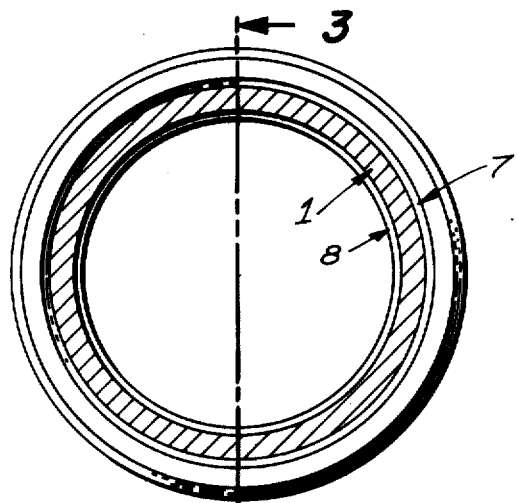
FIG. 1 is a sectional view taken through 1—1 of FIG. 3 with a pipe end shown in section and a coupling shown in end elevation. The coupling being in its initial condition before constriction.
Figure 2:
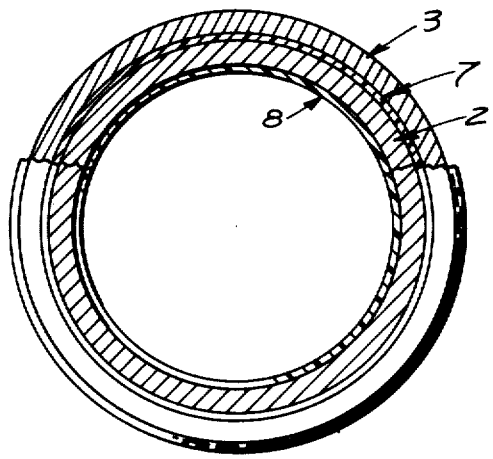
FIG. 2 is a sectional view thereof taken through 2—2 of FIG. 3 with the coupling partially in end elevation and partially in section as it appears before constriction.
Figure 3:
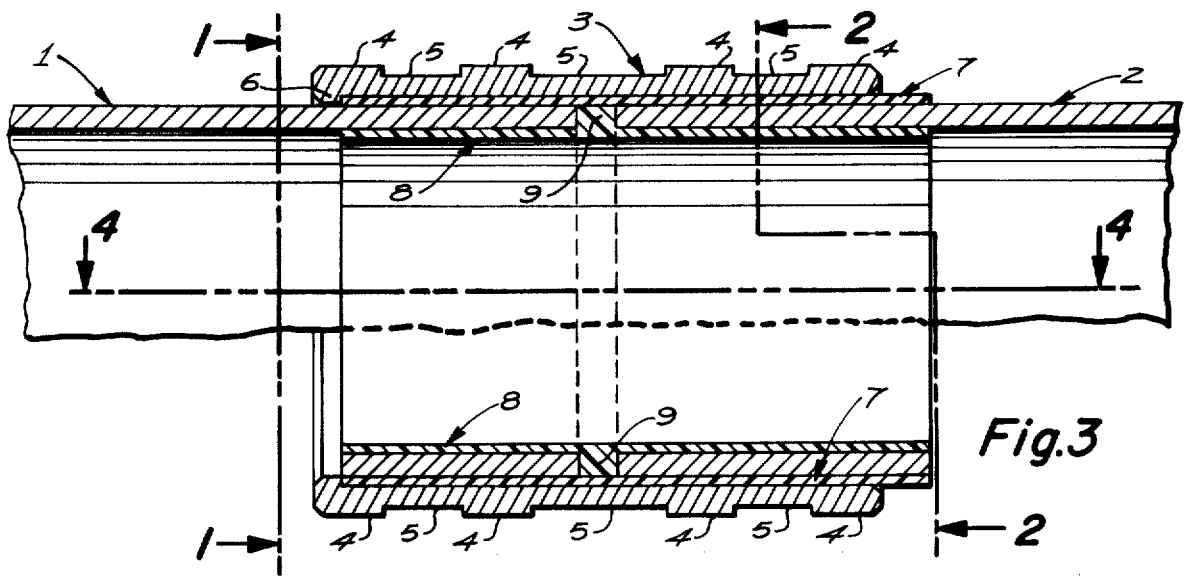
FIG. 3 is a longitudinal sectional view taken through 3—3 of FIG. 1 showing the pipe ends fragmentarily the coupling being shown in its initial condition.
Figure 4:
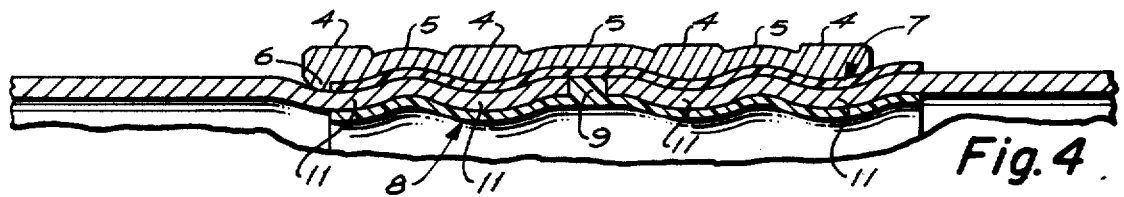
FIG. 4 is a longitudinal sectional view taken through 4—4 of FIG. 3 showing the coupling as it appears after constriction into locking engagement with the pipe ends.

The pipe coupling is intended to be fitted on a pair of confronting pipe ends 1 and 2. The coupling includes a collar 3 preferably formed of mallable iron such as the material from which conventional screwthreaded collars are formed and also corresponds in composition to the material comprising the pipes to be joined. The collar is cylindrical and includes a series of external flanges or bands 4 which is relatively wide but of shallow depth, two of the bands being disposed at the ends of the collar 2. The bands or flanges are separated by portions of the collar indicated by 5 of reduced external diameter. One end of the collar is provided with an internal flange 6 underlying an external flange 4. The internal flange has approximately the same dimensions as the external flanges. Except for the flange 6, the bore of the collar 3 is of uniform diameter.

The internal flange 6 is dimensioned to provide a sliding fit over a pipe end. The remainder of the collar defining with the pipe ends, an annular space. Fitted in this space is a sleeve or liner 7 of plastic insulating material which except for the flange 6 extends the length of the collar and preferably protrudes beyond the end of the collar opposite from the internal flange. Fitted within the pipe ends, interposed between the pipe is an internal sleeve 8 of insulating material including an external flange 9 interposed between the extremities of the pipe.

After the coupling has been fitted on the confronting ends 1 and 2 of pipe to be joined, a constricting tool 10 as such shown in my previous U.S. Pat. No. 3,579,794 is forced along the collar from one end to the other. The dimensions of the constricting die is slightly less than the externally reduced portions 5 of the collar. As a result the flanges 4 are obliterated by being pressed radially inward so that the entire outer surface of the collar is of essentially uniform diameter. The constricting die causes the internal flange 6 to constrict inwardly forming an indented band 11 in the pipe end which securely locks the collar to the pipe end 1. Constriction of external flanges 4 causes the sleeve 7 to form sealing portions between both pipe ends 1 and 2 and the collar 3. Within the regions underlying the constricted flanges 4, the constricting force causes the sleeve 7 to constrict the pipe ends thereby to produce internal locking bands or flanges 12.

It has been found that by the provision of the initial external flange of relatively shallow depth and substantial width, that deformation of the collar to form the internal bands or flanges 11 produce compression forces on the sleeve 7, which are free of stress concentrations; that is, the forces are distributed so that they are well within the compression strength of the sleeve so as to insure the maintanance of an insulating barrier between the collar and the pipe end 2. Some slight flow of the plastic material does occur so that there is a frictional bond between the collar and the pipe as well as a mechanical interlock sufficient to withstand the loads which might be imposed to separate the collar and pipe.

Figure 6:
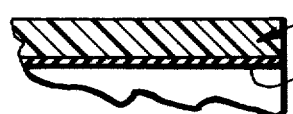
FIG. 6 is an enlarged fragmentary sectional view of the outer insulation sleeve.
Figure 5:
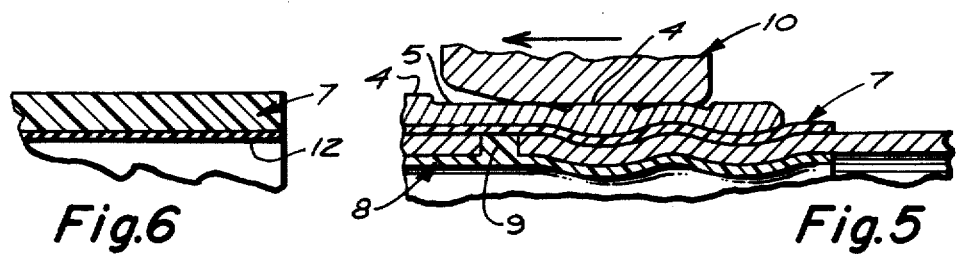
FIG. 5 is a fragmentary sectional view, corresponding to FIG. 4, showing a constricting die in the course of constricting the coupling.

The frictional bond of the sleeve to the pipe ends, and the seal may be enhanced by use of an epoxy resin coating 12 within the sleeve 7 as indicated in FIG. 6.

The strength of the connection between the collar and pipe end 2 is not of course as great as the connection between the collar and the pipe end 1. If insulation is not required, both ends of the collar may be provided initially with internal flanges 6.

The internal sleeve 8 provides a wide band of insulation between the pipes, and the flange 9 prevents end-to-end contact between the pipe ends.

While having fully described my invention, it is to be understood that I am not to be limited to the details herein set forth, but that my invention is of the full scope of the appended claims.

I claim:

1. A constricted collar pipe coupling, comprising:
   a. an inner sleeve of electrical insulating material having an external stop flange;
   b. a pair of pipe ends initially fitted over the sleeve and abutting the stop flange;
   c. an outer sleeve of electrical insulating material fitted over the pipe ends;
   d. and a collar formed of mallable material having initially a cylindrical bore receiving the outer sleeve, pipe ends and inner sleeve;
   e. said collar having, initially, a cylindrical outer surface interrupted by at least a pair of external flanges of uniform thickness overlying each pipe end;
   f. said flanges being constricted to essentially the same dimension of the outer cylindrical surface of the collar therebetween producing a pair of undulated depressions in each pipe end and corresponding portions of the sleeves and inner surface of the collar.

2. A constricted collar pipe coupling, as defined in claim 1, wherein:
   a. one end of the collar projects axially beyond the outer sleeve and includes an internal flange;
   b. one of the external flanges overlies the internal flange causing the internal flange to press against the underlying tube end upon said constriction of the outer flange.

* * * * *